United States Patent [19]

Clawin et al.

[11] Patent Number: 5,652,702
[45] Date of Patent: Jul. 29, 1997

[54] SWITCHED-MODE POWER SUPPLY WITH SINUSOIDAL CURRENT CONSUMPTION

[75] Inventors: Detlef Clawin, Bochum; Michael Lenz, Zorneding, both of Germany

[73] Assignee: Siemens Aktiengesellschaft, Munich, Germany

[21] Appl. No.: 493,808

[22] Filed: Jun. 22, 1995

[30] Foreign Application Priority Data

Jun. 22, 1994 [DE] Germany .................. 44 21 806.0

[51] Int. Cl.⁶ .................. H02M 7/04; G05F 1/56
[52] U.S. Cl. .................. 363/89; 323/282; 323/285
[58] Field of Search .................. 363/89, 124; 323/282, 323/315, 316, 285

[56] References Cited

U.S. PATENT DOCUMENTS

| | | | |
|---|---|---|---|
| 4,268,789 | 5/1981 | Nagano | 323/315 |
| 4,677,366 | 6/1987 | Wilkinson et al. | |
| 5,179,528 | 1/1993 | Robertson et al. | 364/715.02 |
| 5,424,665 | 6/1995 | Sueri et al. | 323/315 |

FOREIGN PATENT DOCUMENTS

92/15145  9/1992  WIPO.

OTHER PUBLICATIONS

Unitrode Manual. Dixon, Jr., Lloyd H. 'High Power Factor Pre-regulators for Off-Line Power Supplies'. Chapter 6, pp. 6-1 through 6-16.

IEEE Publication PESC '89 Record Volume II, June 1989, "Design of Feedback Loop in Unity Power Factor . . . ".

Publication: Unitrode Manual, Appendix, Chapter 6, pp. 6-1 to 6-16 (Dixon) "High Power Factor Preregulators for Off-Line Power Supplies".

*Primary Examiner*—Peter S. Wong
*Assistant Examiner*—Derek J. Jardieu
*Attorney, Agent, or Firm*—Herbert L. Lerner; Laurence A. Greenberg

[57] ABSTRACT

A switched-mode power supply with sinusoidal current consumption includes a rectifier receiving a sinusoidal alternating voltage and having an output at which a rectified alternating voltage can be picked up. A switched controller receives the rectified alternating voltage as an input signal and supplies an output signal. A multiplier device receives and multiplies the input signal by the output signal of the switched controller and generates an output signal being supplied to the switched controller. A divider divides the output signal of the switched controller being supplied to the multiplier device by the input signal being supplied to the controller and weighted on a basis of a transfer function formed by at least two linear partial functions, and delivers a resultant signal to the multiplier device.

4 Claims, 2 Drawing Sheets

SWITCHED-MODE POWER SUPPLY WITH SINUSOIDAL CURRENT CONSUMPTION

BACKGROUND OF THE INVENTION

Field of the Invention

The invention relates to a switched-mode power supply with sinusoidal current consumption, having a rectifier to which a sinusoidal alternating voltage can be supplied and having an output at which a rectified alternating voltage can be picked up, the alternating voltage is delivered to a switched controller, and a multiplier device receives the input signal and the output signal of the switched controller, multiplies the two variables and generates an output signal being supplied to the switched controller.

One such switched-mode power supply (SPMS) is known, for instance, from U.S. Pat. No. 4,677,366. An SPMS with sinusoidal current consumption includes a pilot control unit being used to relieve a voltage regulating circuit. A typical configuration of that kind may be found in the publication entitled: Unitrode-Datenbuch, Anhang [Unitrode Manual, Appendix], Chapter 6, pp. 6-1 to 6-16. One learns from both references that a result of a theoretical derivation of the above-mentioned pilot control function is that a pilot control variable $V_{in}$ must be exactly squared and in this regard reference is made to FIG. 6 on pages 6-8. A basic circuit diagram for such a configuration is shown in and described below with reference to FIG. 3.

The realization of such a circuit requires a so-called slope multiplier, for performing the squaring. That makes the overall expense for circuitry relatively high, but an exact square dependency of $V_{in}$ as a pilot control variable has some practical disadvantages as well. For instance, in power supply networks with a regulation of consumption through the voltage amplitude, the current consumption at low voltages will rise more and more in the event of a brownout. That is common, especially in the United States.

SUMMARY OF THE INVENTION

It is accordingly an object of the invention to provide a switched-mode power supply with sinusoidal current consumption, which overcomes the hereinafore-mentioned disadvantages of the heretofore-known devices of this general type and which has the advantages of the square characteristic curve, particularly for conventional supply voltages of 110 or 220 V.

With the foregoing and other objects in view there is provided, in accordance with the invention, a switched-mode power supply with sinusoidal current consumption, comprising a rectifier for receiving a sinusoidal alternating voltage and having an output at which a rectified alternating voltage can be picked up; a switched controller for receiving the rectified alternating voltage as an input signal and supplying an output signal; a multiplier device for receiving and multiplying the input signal by the output signal of the switched controller and generating an output signal being supplied to the switched controller; and a divider for dividing the output signal of the switched controller being supplied to the multiplier device by the input signal being supplied to the controller and weighted on a basis of a transfer function formed by at least two linear partial functions, and delivering a resultant signal to the multiplier device.

In accordance with another feature of the invention, the at least two linear partial functions include a first partial function being applied to an input voltage of from 0 V to a kink voltage $U_K$ with a slope of 0, and a second partial function beyond the kink voltage $U_K$ being a straight line with a slope m, where m>0.

In accordance with a further feature of the invention, there is provided a load; a buffer amplifier receiving the rectified alternating voltage, feeding the load, and supplying an output signal; a transistor having a load path, an output circuit, and a control connection receiving a reference voltage; a current mirror having an input circuit receiving the output signal of the buffer amplifier and supplying an output current $I_K$ to the load path of the transistor; and a current source and an output terminal being connected to the output circuit of the transistor.

In accordance with a concomitant feature of the invention, the load is a resistor in the input circuit of the current mirror, and the slope of the second linear partial function is adjustable by the resistor.

It is an advantage of the invention that by splitting it into two linear partial functions, a so-called base partial function can be developed having a linear dependency which results in performance that is more advantageous for actual use, since at extremely low network voltages, the current consumption is limited by the system itself.

Other features which are considered as characteristic for the invention are set forth in the appended claims.

Although the invention is illustrated and described herein as embodied in a switched-mode power supply with sinusoidal current consumption, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 3:
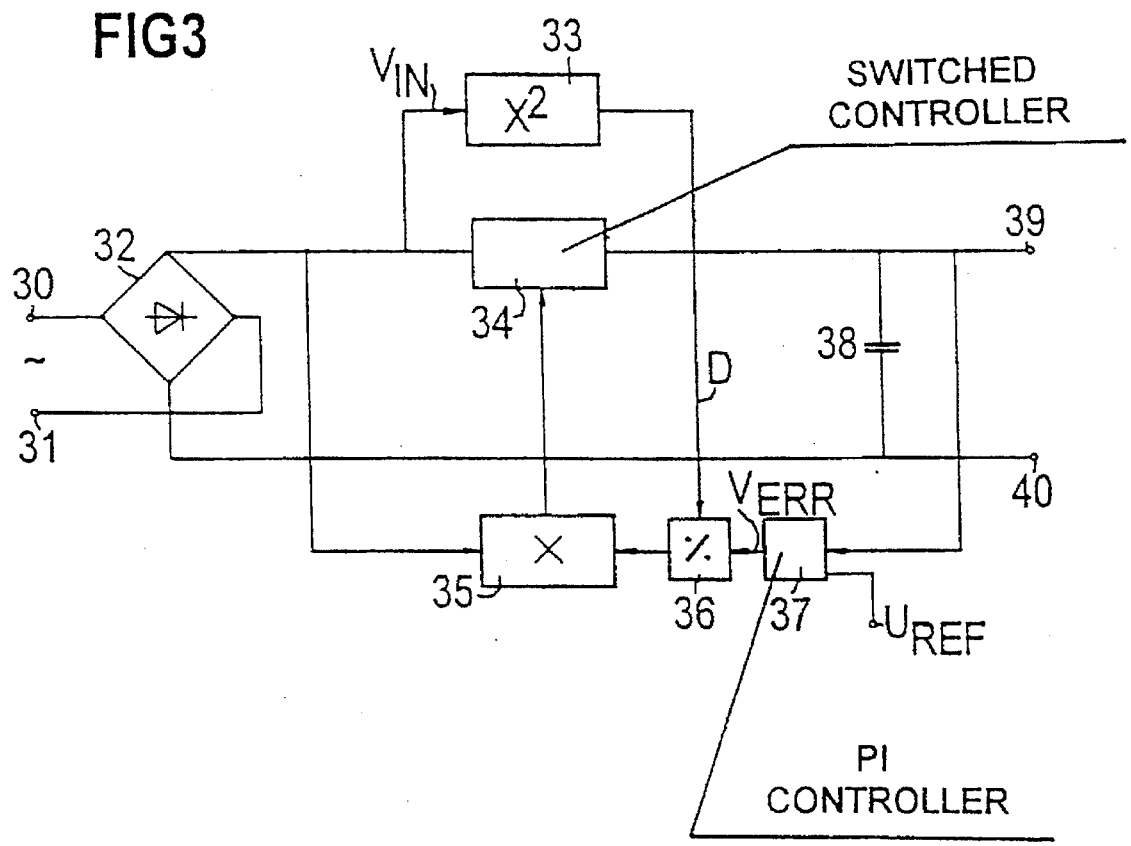
FIG. 3 is a block and schematic circuit diagram of a configuration according to the prior art.

Referring now to the figures of the drawing in detail and first, particularly, to FIG. 3 thereof, there is seen a basic circuit diagram of a switched-mode power supply (SPMS) which is known, for instance, from U.S. Pat. No. 4,677,366 and from the Unitrode-Datenbuch, Anhang [Unitrode Manual, Appendix], Chapter 6, pp. 6-1 to 6-16. As mentioned above, an SPMS with sinusoidal current consumption has a pilot control unit for relieving a voltage regulating circuit. The teaching of both of the references is that the result of the theoretical derivation of the aforementioned pilot control function is that a pilot control variable $V_{in}$ in this respect must be exactly squared, as is also seen in FIG. 6 on pages 6-8.

Reference numerals 30 and 31 indicate input terminals to which an alternating voltage can be delivered and which can be connected to a rectifier 32. An output of the rectifier 32 is connected through a regulating unit 34 to a capacitor 38 and to output terminals 39, 40. A voltage at the output of the rectifier 32 is picked up and delivered through non-illustrated networks, on one hand to a squaring unit 33 and on the other hand to a multiplier unit 35. The squaring unit 33 generates a signal $$D = K_s \cdot K_f V_{IN}^2,$$

from the input voltage $V_{IN}$ delivered to it, where $K_s$ is a constant and $K_f$ is a division factor. That signal D is delivered to a division unit 36, which also receives an error voltage signal $V_{ERR}$ through an operational amplifier 37 operating as a PI controller. The PI controller 37 compares the output voltage at the terminal 39 with a reference voltage $U_{REF}$ and evaluates it. The division unit 37 then generates a voltage signal $$V_{DIV} = \frac{N}{D} \quad K_d = \frac{K_d \cdot V_{ERR}}{K_s \cdot K_f \cdot V_{IN}^2}$$

from the signals D and $V_{ERR}$ where $K_d$ is a further constant. This signal is multiplied by a second downward-divided input voltage $K_{iN} \cdot V_{iN}$ and delivered to the controller 34.

Constructing such a circuit requires a so-called slope multiplier, for performing the squaring. That makes the overall expense for circuitry relatively high.

However, an exact square dependency of $V_{in}$ as a pilot control variable has some practical disadvantages as well. For instance, in power supply networks with a regulation of consumption through the voltage amplitude, the current consumption at low voltages will rise more and more in the event of a brownout. That is common, especially in the United States.

Figure 2:
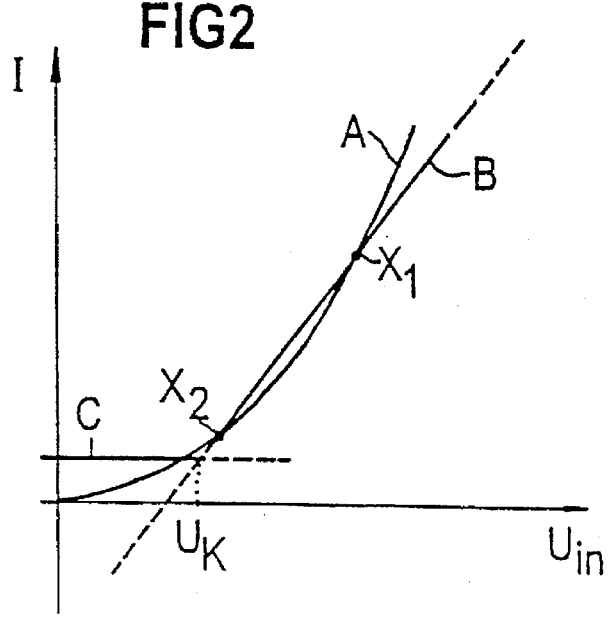
FIG. 2 is a diagram of a transfer function of the circuit according to the invention which is shown in FIG. 1 and a transfer function according to the prior art.

In FIG. 2, reference symbol A represents a quadratic function of a circuit according to the aforementioned prior art. The circuit configuration according to the invention replaces that quadratic function in the operating range with two linear partial functions B, C. The function B is a straight line of slope m, where m>0, and the function C is a straight line of slope 0. The two straight lines merge with one another at a point $U_k$.

Errors that occur in the operating range can thus be kept adequately slight. This is true particularly for the case in which two intersections $X_1$, $X_2$ with the quadratic function A are chosen for two main rated input voltages of 110 and 220 V. As compared with earlier versions, the linear base range C proves to be especially favorable, because performance that is especially favorable in actual use is attained through it. Through the use of this provision, at extremely low network voltages, the current consumption is limited by the system itself.

Figure 1:
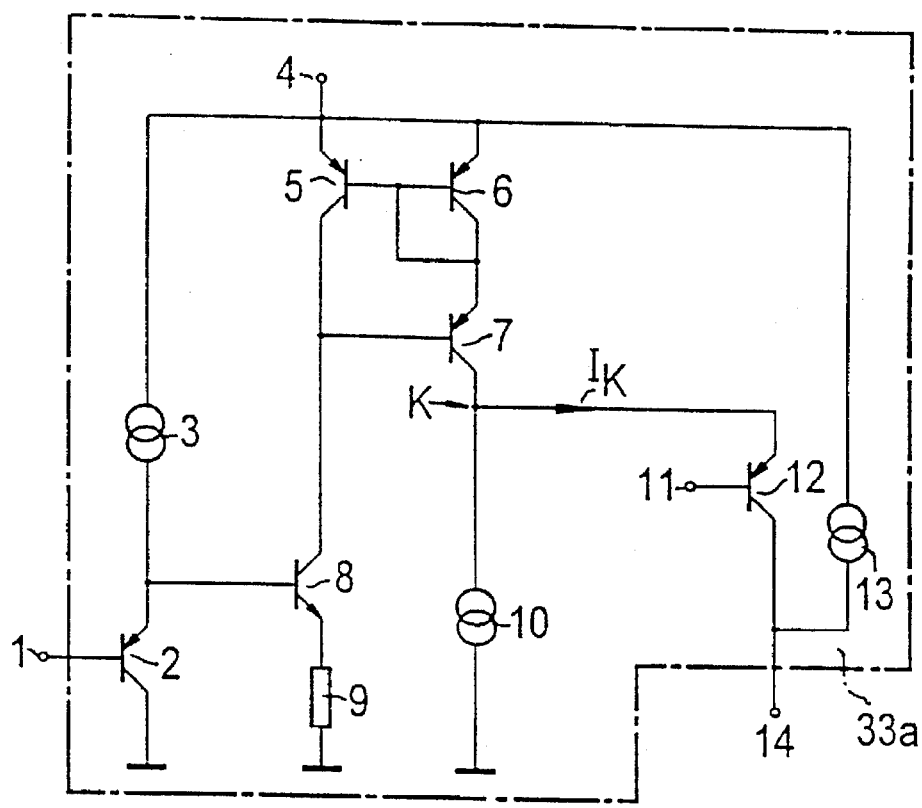
FIG. 1 is a schematic diagram of a circuit configuration according to the invention for forming a pilot control variable.

In FIG. 1, reference numeral 1 indicates an input terminal, to which the voltage $V_{IN}$ can be supplied. The voltage $V_{IN}$ may, for instance, be the RMS value of the rectified input voltage. The input terminal 1 is connected to a base of a first pnp transistor 2. A collector of the pnp transistor 2 is connected to ground, and an emitter is connected through a current source 3 to a supply voltage source 4. The emitter of the transistor 2 is also connected to a base of an npn transistor 8. An emitter of the transistor 8 is connected through a resistor 9 to ground. A collector of the transistor 8 is connected both to a base of a second pnp transistor 7 and to a collector of a third pnp transistor 5. A base of the transistor 5 is connected to a base of a fourth pnp transistor 6, to a collector of the transistor 6 and to an emitter of the transistor 7. Emitters of transistors 5 and 6 are connected to one another and to the supply voltage terminal 4. A collector of the transistor 7 is connected firstly through a current source 10 to ground and secondly to an emitter of a fifth pnp transistor 12. A base of the transistor 12 can be supplied with a reference voltage through a terminal 11. A collector of the transistor 12 is connected to an output terminal 14 and is connected through a current source 13 to the supply voltage terminal 4.

In a simple way, the circuit configuration shown in FIG. 1 simulates the transfer function shown in FIG. 2 which is formed of the linear partial functions B, C and can replace the squaring unit 33 of FIG. 3, for example. In FIG. 1, the entire unit is therefore marked with reference numeral 33a.

The input voltage at reference numeral 1 is transferred to the resistor 9 by a buffer amplifier formed of the elements 2, 3, 8.

The current in the collector branch of the transistor 8 is approximately $$I_{C8} \approx \frac{U_{in}}{R_9}$$

Through the use of a current mirror formed of the transistors 5, 6 and 7, a difference between a mirror current and a current of the source 10 is formed at a node K. The transistor 12 out-couples this current difference as soon as it is positive. To that end, the base of the transistor 12 must be connected through the terminal 11 to a suitable potential. The output current of the circuit is formed of a sum of a collector current of the transistor 12 and a current of the current source 13.

The resultant characteristic curve which is shown in FIG. 2, can be determined as follows: the differential current of the node K becomes $$I_K = \frac{U_{in}}{R_9} - I_{10}$$

The transistor 12 opens only at positive values of $I_K$, so that the output current rises with a slope $1/R_9$ from the kink voltage $U_K$ on. The zero position of the function $$I_K = \frac{U_{in}}{R_9} - I_{10} = 0$$

furnishes the kink voltage $U_K$:

$$U_K = I_{10} \cdot R_9$$

The constant C is equal to the current $I_{13}$.

We claim:

1. A switched-mode power supply with sinusoidal current consumption, comprising:
   a rectifier for receiving a sinusoidal alternating voltage and having an output at which a rectified alternating voltage can be picked up;
   a switched controller for receiving the rectified alternating voltage as an input signal and supplying an output signal;
   a divider receiving the input signal of said switched controller after weighting thereof on a basis of a transfer function formed by at least two linear partial functions, said divider dividing a modified and fed back output signal by the weighted input signal, and a multiplier device for receiving and multiplying the input signal by an output signal of said divider and generating an output signal being supplied to said switched controller.

2. The switched-mode power supply according to claim 1, wherein the at least two linear partial functions include a first partial function being applied to an input voltage of from zero volts to a kink voltage with a slope of zero, and a second partial function beyond the kink voltage being a straight line with a slope m greater than zero.

3. The switched-mode power supply according to claim 2, including:

a load;

a buffer amplifier receiving the rectified alternating voltage, feeding said load, and supplying an output signal;

a transistor having a load path, an output circuit, and a control connection receiving a reference voltage;

a current mirror having an input circuit receiving the output signal of said buffer amplifier and supplying an output current to the load path of said transistor; and a current source and an output terminal being connected to the output circuit of said transistor.

4. The switched-mode power supply according to claim 3, wherein said load is a resistor in the input circuit of said current mirror, and the slope of the second linear partial function is adjustable by said resistor.

* * * * *